(12) United States Patent
Foelling et al.

(10) Patent No.: US 11,650,158 B2
(45) Date of Patent: May 16, 2023

(54) FLUORESCENCE SCANNING MICROSCOPE AND METHOD FOR IMAGING A SAMPLE

(71) Applicant: LEICA MICROSYSTEMS CMS GMBH, Wetzlar (DE)

(72) Inventors: Jonas Foelling, Freiburg (DE); Lars Friedrich, Weinheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 0 days.

(21) Appl. No.: 17/603,594

(22) PCT Filed: Apr. 17, 2020

(86) PCT No.: PCT/EP2020/060836
§ 371 (c)(1),
(2) Date: Jan. 13, 2022

(87) PCT Pub. No.: WO2020/212563
PCT Pub. Date: Oct. 22, 2020

(65) Prior Publication Data
US 2022/0196554 A1 Jun. 23, 2022

(30) Foreign Application Priority Data
Apr. 17, 2019 (DE) .......................... 102019110157.3

(51) Int. Cl.
*G01N 21/64* (2006.01)
(52) U.S. Cl.
CPC ..... *G01N 21/6458* (2013.01); *G01N 21/6408* (2013.01)
(58) Field of Classification Search
CPC .................. G01N 21/6458; G01N 21/6408
See application file for complete search history.

(56) References Cited

U.S. PATENT DOCUMENTS

| 2008/0258077 A1* | 10/2008 | Baer | G03F 7/704 |
| | | | 250/459.1 |
| 2008/0316469 A1 | 12/2008 | Birk et al. | |
| | (Continued) | | |

FOREIGN PATENT DOCUMENTS

| CN | 105043988 A | 11/2015 |
| DE | 102007011305 A1 | 9/2008 |
| | (Continued) | |

OTHER PUBLICATIONS

Sun, Yuansheng et al: "A novel pulsed STED microscopy method using FastFLIM and the phasor plots", Progress in Biomedical Optics and Imaging, SPIE—International Society for Optical Engineering, Bellingham, WA, US, vol. 10069, Feb. 21, 2017 (Feb. 21, 2017), pp. 100691C-1-100691C-16, XP060086016.
(Continued)

*Primary Examiner* — Hugh Maupin
(74) *Attorney, Agent, or Firm* — Leydig, Voit & Mayer, Ltd.

(57) ABSTRACT

A fluorescence scanning microscope includes excitation and de-excitation light sources, which are designed to generate an excitation and a de-excitation light distribution, respectively. An illumination unit combines the light distributions to form a light distribution scanning over multiple illumination target points of a sample in such a way that an intensity maximum of the excitation light distribution and an intensity minimum of the de-excitation light distribution are spatially superimposed on one another. A detector detects fluorescence photons emitted from the respective illumination target point as a function of their arrival times. A processor evaluates the fluorescence photons with respect to the arrival times, generates a first pixel and a second pixel based thereon, assembles the first and second pixels to form first and second sample images, respectively, and, by means (Continued)

of the two sample images, determines a spatial offset between the intensity maximum and the intensity minimum.

18 Claims, 6 Drawing Sheets

(56) References Cited

U.S. PATENT DOCUMENTS

| | | | |
|---|---|---|---|
| 2010/0142054 | A1 | 6/2010 | Kastrup et al. |
| 2012/0236398 | A1 | 9/2012 | Gugel et al. |
| 2015/0226950 | A1 | 8/2015 | Booth et al. |
| 2016/0018786 | A1 | 1/2016 | Matsumoto |
| 2016/0216498 | A1 | 7/2016 | Seyfried et al. |
| 2019/0195800 | A1 | 6/2019 | Heine et al. |
| 2019/0235219 | A1 | 8/2019 | Peng et al. |
| 2020/0333252 | A1* | 10/2020 | Krachmalnicoff ... G02B 21/008 |

FOREIGN PATENT DOCUMENTS

| | | |
|---|---|---|
| DE | 102013227107 A1 | 3/2015 |
| DE | 112014001147 T5 | 11/2015 |
| EP | 2158475 A2 | 3/2010 |
| WO | WO 2013/144898 A2 | 10/2013 |
| WO | WO 2017/011878 A2 | 1/2017 |
| WO | WO 2018/042056 A1 | 3/2018 |
| WO | WO 2018/045014 A1 | 3/2018 |

OTHER PUBLICATIONS

Tortarolo, Giorgio et al: "The SPLIT approach for enhancing the spatial resolution in pulsed STED microscopy with FastFLIM and phasor plots", Progress in Biomedical Optics and Imaging, SPIE—International Society for Optical Engineering, Bellingham, WA, US, vol. 10882, Feb. 22, 2019 (Feb. 22, 2019), pp. 108820I-1-108820I-11, XP060118977.

Travis J. Gould et al: "Auto-aligning stimulated emission depletion microscope using adaptive optics," Optics Letters, vol. 38, Nr. 11, Jun. 1, 2013 (Jun. 1, 2013), pp. 1860-1862, XP055090214, US.

Gould, Travis J. et al. "Auto-aligning stimulated emission depletion microscope using adaptive optics," NIH Public Access Author Manuscript, Aug. 22, 2013, pp. 1-7, US.

Andrè Klauss et al: "Binary phase masks for easy system alignment and basic aberration sensing with spatial light modulators in STED microscopy", Scientific Reports, vol. 7, Nr. 1, Nov. 16, 2017 (Nov. 16, 2017), XP055588222, pp. 1-11, Nature, UK.

Reuss, Matthias "Simpler STED setups," PhD Thesis, Ruperto-Carola University of Heidelberg, Germany, Dec. 15, 2010, pp. 1-137.

Vicidomini, Giuseppe et al. "Sharper low-power STED nanoscopy by time gating," Nature Methods, Jun. 5, 2011, 8, pp. 571-573, Nature America, Inc., US.

Auksorius, Egidijus et al. "Simulated emission depletion microscopy with a supercontinuum source and fluorescence lifetime imaging," Optics Letters, vol. 33, No. 2, Jan. 15, 2008, pp. 113-115, Optical Society of America, US.

Bückers, Johanna et al. "Simultaneous multi-lifetime multi-color STED imaging for colocalization analyses," Optics Express, vol. 19, No. 4, Feb. 14, 2011, pp. 3130-3143, Optical Society of America, US.

Yifan Wang et al. "A 3D Aligning Method for Stimulated Emission Depletion Microscopy Using Fluorescence Lifetime Distribution," Microscopy Research and Technique 77, pp. 935-940, Aug. 11, 2014, Wiley Periodicals Inc., US.

* cited by examiner

FLUORESCENCE SCANNING MICROSCOPE AND METHOD FOR IMAGING A SAMPLE

CROSS-REFERENCE TO PRIOR APPLICATIONS

This application is a U.S. National Phase application under 35 U.S.C. § 371 of International Application No. PCT/EP2020/060836, filed on Apr. 17, 2020, and claims benefit to German Patent Application No. DE 10 2019 110 157.3, filed on Apr. 17, 2019. The International Application was published in German on Oct. 22, 2020, as WO 2020/212563 A1 under PCT Article 21(2).

FIELD

The invention relates to a fluorescence scanning microscope and a method for imaging a sample using a fluorescence scanning microscope.

BACKGROUND

The so-called STED method is often used in the field of fluorescence microscopy for ultrahigh-resolution imaging of a sample, in which the sample is illuminated using a light distribution which is generated from a superposition of excitation light and de-excitation light. STED stands here for "stimulated emission depletion". The excitation light is designed to excite fluorophores present in the sample to the spontaneous emission of fluorescent light. In contrast, the de-excitation light, the wavelength of which is different from the wavelength of the excitation light, is used to de-excite fluorophores excited by the excitation light in the course of a stimulated emission of fluorescent light. To increase the image resolution, the de-excitation light is overlaid with a special light distribution on the excitation light, which is focused in the form of a laser beam on the respective illumination target point in the sample. This de-excitation light distribution has an intensity zero point and intensity flanks rising as steeply as possible adjoining thereon. To achieve the best possible image resolution, the de-excitation light distribution has to be superimposed on the excitation light distribution so that the zero point of the de-excitation light distribution coincides precisely with the intensity maximum of the excitation light distribution. If this is ensured, the spontaneous emission of fluorescent radiation in the outer regions of the excitation light distribution is thus suppressed in the illumination target point, so that spontaneously emitted fluorescent light is only detected from a region around the zero point of the de-excitation light distribution. If this sample region is moved in a scanning method over a plurality of illumination target points of the sample, a high-resolution image of the sample can thus be obtained by the detection of the fluorescent light not suppressed by the de-excitation light distribution.

Figure 1:
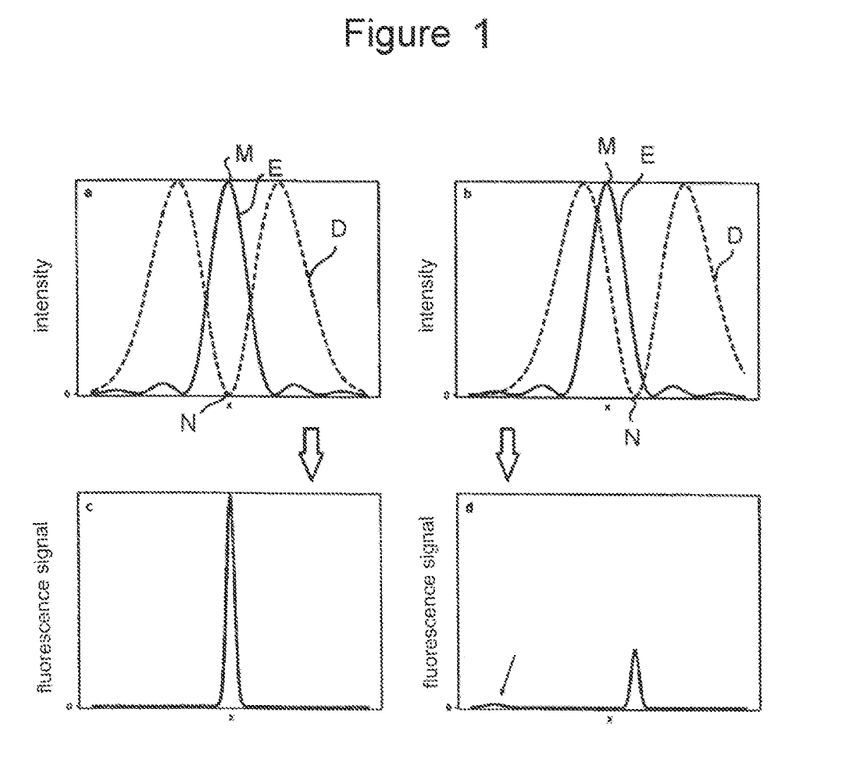
FIG. 1 shows diagrams (a, b, c, d) to illustrate how the spatial superposition of a de-excitation light distribution and an excitation light distribution influences the detection of a fluorescence signal.

If it is not ensured that the zero point of the de-excitation light distribution coincides with the maximum of the excitation light distribution, two effects thus occur, by which the image quality is reduced. Firstly, a misalignment in the superposition of de-excitation light and excitation light causes a reduction of the image brightness. Secondly, such a misalignment emphasizes undesired secondary maxima in the excitation light distribution. Both effects are illustrated in FIG. 1, wherein a one-dimensional light distribution in the direction x is presumed there for the sake of simplicity.

FIG. 1a shows the case of an optimal superposition of de-excitation light and excitation light. An excitation light distribution E is shown by a solid line and a de-excitation light distribution D by a dashed line. In this optimal case, the zero point of the de-excitation light distribution D identified by N is precisely superimposed on the maximum M of the excitation light distribution E in the direction x.

FIG. 1c shows the fluorescent light distribution detected in the respective illumination target point, which results from the optimum superposition of de-excitation light and excitation light according to FIG. 1a. This fluorescent light distribution shows a high-intensity and sharp maximum, the low full width at half maximum of which determines the spatial resolution in direction x.

In contrast, the case of a misalignment is shown in FIG. 1b, in which the zero point N of the de-excitation light distribution D does not coincide with the maximum M of the excitation light distribution E. A fluorescent light distribution, which is shown in FIG. 1d, results from this misalignment. As can be seen in comparison to FIG. 1c, the imprecise superposition of de-excitation light and excitation light results in a significant reduction of the maximum of the fluorescent light distribution. Moreover, significant secondary maxima occur in the fluorescent light distribution, as indicated by the arrow in FIG. 1d. Such secondary maxima occur in the direction x at points at which the fluorescence excitation is not extinguished to a sufficient extent by the de-excitation light distribution.

Various solutions are known from the prior art which are supposed to ensure that the excitation maximum and the de-excitation zero point coincide in location. A first method is known in technical circles under the term "easy STED" and is described in document EP 2 158 475 A2 and in Reuss, M., "Simpler STED Setups", Ruperto-Carola University of Heidelberg, 2010 (PhD Thesis). The basic concept disclosed in these documents is to guide the excitation light and the de-excitation light through a shared monomodal optical fiber onto the sample. It is thus ensured that the two light distributions are always precisely superimposed in the desired manner in the sample. However, it is problematic that a phase mask has to be arranged between the exit end of the optical fiber and the objective, which is to influence the de-excitation light in such a way that it has the desired light distribution in the illumination target point. In contrast to typical STED configurations, in which such a phase mask acts solely in the beam path of the de-excitation light, however, the excitation light also passes through the phase mask in this method. To avoid influencing the excitation light due to the phase mask as much as possible, the phase mask has to be manufactured from different materials in a complex manner. It has to remain ensured here that the phase mask causes the desired phase change at the wavelength of the de-excitation light. A significant disadvantage of this method is thus that the phase mask especially has to be optimized for a specific combination of wavelengths of the excitation light and the de-excitation light. For this reason, the resulting microscope structure is inflexible with respect to the usable wavelengths and thus the usable fluorophores. A further disadvantage is that in general the detected fluorescent light also passes the phase mask and is thus attenuated.

A further method is described in document DE 10 2007 011 305 A1. In this method, a calibration slide is used to measure the relative position of excitation light distribution and de-excitation light distribution. With knowledge of the relative position, the superposition can then be optimized by means of one or more positioning elements in one of the separate beam paths for excitation light and de-excitation light. One special feature of this method is that the calibration slide is not inserted instead of the sample, but rather is pivoted into an intermediate image plane. In this way, it is not necessary to remove the sample to check or optimize the alignment. However, this method has the disadvantage that the calibration slide has to be pivoted into an intermediate image plane and the microscope has to be reconfigured so that it operates in the reflection mode. This method is thus slow.

An adjustment of a STED microscope is also disclosed in document DE 10 2013 227 107 A1. However, this method predominantly relates to the alignment of the phase mask in the beam path of the de-excitation light, but not the superposition of excitation and de-excitation light.

All above-mentioned methods moreover have the disadvantage that the influence of the sample on the relative location of excitation light and de-excitation light cannot be taken into consideration. In particular the variation of the index of refraction within the sample thus influences the location of the light distributions. One solution for this purpose is described in Gould, T. J.; Kromann, E. B.; Burke, D.; Booth, M. J. & Bewersdorf, J. "Auto-aligning stimulated mission depletion microscope using adaptive optics", Opt. Lett., 2013, 38, 1860-1862. In this method, the optimal superposition of excitation and de-excitation light is determined on the basis of the high-resolution image itself. A measured value which assesses the image quality is ascertained here on the basis of the image brightness and the image sharpness. In an optimization process, a spatial light modulator, abbreviated SLM, is then controlled in the beam path of the de-excitation light so that the measured value is maximized. This method has the disadvantage that a series of iterations steps are necessary for the optimization, since the measured value does not contain any information about the direction in which the de-excitation light distribution has to be moved to achieve optimal superposition.

Furthermore, a method is referred to from the prior art which is known in technical circles as "time-gated STED" and is described, for example, in Vicidomini, G.; Moneron, G.; Han, K. Y.; Westphal, V.; Ta, H.; Reuss, M.; Engelhardt, J.; Eggeling, C. & Hell, S. W. "Sharper low-power STED nanoscopy by time gating" Nat Methods, 2011, 8, 571-573. This method operates using a pulsed laser light source for generating the excitation light and a continuous laser light source, i.e., a continuously excited laser, for generating the de-excitation light. The method takes into consideration that the detected arrival times of the fluorescence photons contain information about whether or not the photons originate from the region of the zero point of the de-excitation light distribution.

SUMMARY

In an embodiment, the present invention provides a fluorescence scanning microscope including an excitation light source, which is designed to generate an excitation light distribution, which excites fluorophores present in a sample to a spontaneous emission of fluorescence photons, and a de-excitation light source, which is designed to generate a de-excitation light distribution, which de-excites the fluorophores excited by the excitation light distribution in the sample in a course of a stimulated emission of fluorescence photons. An illumination unit is designed to combine the excitation light distribution and the de-excitation light distribution to form a light distribution scanning over multiple illumination target points of the sample in such a way that an intensity maximum of the excitation light distribution and an intensity minimum of the de-excitation light distribution are spatially superimposed on one another in the respective illumination target point. A detector is designed to detect the fluorescence photons emitted from the respective illumination target point as a function of arrival times of the fluorescence photons. A processor is designed to: evaluate the fluorescence photons detected in the respective illumination target point with respect to the arrival times; generate a first pixel and a second pixel based on the evaluation, which represent the respective illumination target point; assemble the first pixels to form a first sample image and the second pixels to form a second sample image; and, by means of the two sample images, determine a spatial offset between the intensity maximum of the excitation light distribution and the intensity minimum of the de-excitation light distribution.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Embodiments of the invention provide a fluorescence scanning microscope and a method for imaging a sample using such a fluorescence scanning microscope which enable a spatial offset between the maximum of the excitation light distribution and the minimum of the de-excitation light distribution to be determined in a simple manner.

An embodiment of the invention provides a fluorescence scanning microscope, in particular a STED scanning microscope, comprising an excitation light source which is designed to generate an excitation light distribution which excites fluorophores present in a sample to the spontaneous emission of fluorescence photons, and a de-excitation light source, which is designed to generate a de-excitation light distribution, which de-excites the fluorophores excited by the excitation light distribution in the sample in the course of a stimulated emission of fluorescence photons. The fluorescence scanning microscope furthermore comprises an illumination unit, which is designed to combine the excitation light distribution and the de-excitation light distribution to form a light distribution scanning over multiple illumination target points of the sample in such a way that an intensity maximum of the excitation light distribution and an intensity minimum of the de-excitation light distribution are spatially superimposed on one another in the respective illumination target point. Furthermore, the fluorescence scanning microscope comprises a detector which is designed to detect the fluorescence photons emitted from the respective illumination target point as a function of their arrival times. The fluorescence scanning microscope moreover comprises a processor which is designed to evaluate the fluorescence photons detected in the respective illumination target point with respect to their arrival times. The processor is furthermore designed to generate a first pixel and a second pixel on the basis of this evaluation, which represent the respective illumination target point. The processor is moreover designed to assemble the first pixels to form a first sample image and the second pixels to form a second sample image. Finally, the processor is designed to determine a spatial offset between the intensity maximum of the excitation light distribution and the intensity minimum of the de-excitation light distribution on the basis of the two sample images.

The solution proposed according to embodiments of the invention thus provides generating two sample images, which differ from one another with respect to the detected arrival times of the fluorescence photons which are used to generate the respective sample image. The claimed fluorescence scanning microscope thus makes use of the circumstance that the dwell time of the fluorophores in the excited state, which is also referred to hereinafter as the lifetime of the fluorophores, is dependent on whether or not the respective fluorophore is located in the region of the zero point of the de-excitation light distribution. The lifetime is thus solely determined by the rate of the spontaneous emission of the fluorophore in the region of the zero point of the de-excitation light distribution. In contrast, in regions in which the de-excitation light distribution is not equal to zero, the rate of the stimulated emission is added to the rate of the spontaneous emission. The lifetime is thus shortened in the above-mentioned regions. The arrival times detected by the detector thus also include information about the spatial distribution of the fluorophores. This information is incorporated into the two sample images generated according to an embodiment of the invention, since the sample images differ from one another with respect to the arrival times of the fluorescence photons assigned to them. As a result, the spatial offset between the intensity maximum of the excitation light distribution and the intensity minimum of the de-excitation light distribution may be determined from this information in the course of an image comparison.

It is particularly advantageous here that the comparison of the two sample images makes it immediately possible to determine both the direction and also the distance by which the de-excitation light distribution is to be moved relative to the excitation light distribution in order to compensate for the offset and thus achieve optimal superposition of the light distributions. Direction and distance of the offset are determinable algorithmically, so that only a small number of iterations is required to remove the offset, possibly even only a single iteration. In this way, the disadvantages explained at the outset, which result from an incorrect alignment, such as the reduction of the image brightness and the emphasis on undesired secondary maxima in the excitation light distribution can be avoided.

It is also particularly advantageous that the offset between excitation and de-excitation light distribution is determined on the sample to be imaged itself and not, for example, using a calibration slide. The influence is thus inherently already taken into consideration which the sample itself has, for example, as a result of its varying index of refraction on the relative position of excitation and de-excitation light distribution.

Since the two sample images on which the determination of the spatial offset is based represent the different arrival times of the respective detected fluorescence photons and the respective arrival time is in turn dependent on the location of the fluorophore emitting the associated fluorescence photon, the two sample images have different resolutions. In particular, the sample image which represents early fluorescence photons, i.e., photons having comparatively short arrival time, has a lower resolution than the sample image which represents late fluorescence photons, i.e., photons having comparatively long arrival time.

The spatial offset between excitation and de-excitation light distribution can be determined in particular on the basis of two-dimensional sample images. However, it is also possible to detect the offset in all three spatial directions. In this case, a three-dimensional image stack is recorded instead of a two-dimensional sample image. In all cases, the sample image or the image stack which represents the early fluorescence photons contains information about the position of the maximum of the excitation light distribution, while the sample image or the image stack which represents the late fluorescence photons contains information about the location of the zero point of the de-excitation light distribution. The offset can be determined in such a way that the two sample images or image stacks can be brought into a relationship with one another, for example, via a cross-correlation.

In one preferred embodiment, the processor is therefore designed to determine the spatial offset between the intensity maximum of the excitation light distribution and the intensity minimum of the de-excitation light distribution on the basis of the two sample images, in that the two sample images are brought into a relationship with one another via a cross-correlation, for example, by determining the cross-correlation between the two sample images or also only between partial regions of the two sample images corresponding to one another, for example, between individual or multiple lines and/or columns and/or details of the sample images. The application of such a cross-correlation is particularly well suited for determining the spatial offset solely on the basis of the two sample images, without more complex and/or less exact methods known from the prior art being required for this purpose. The latter comprise, for example, the use of a calibration slide or the fitting to an individual fluorescent point object. However, it is to be emphasized in this context that to determine the spatial offset between the intensity maximum of the excitation light distribution and the intensity minimum of the de-excitation light distribution in the scope of an embodiment of the invention, in addition to other methods, for example, a position determination of one or more individual fluorescent point objects visible in both sample images, in particular by means of fitting, is conceivable alternatively or also additionally to the application of a cross-correlation.

The solution proposed here also has the advantage that to determine the spatial offset between excitation and de-excitation light distribution, the configuration of the fluorescence scanning microscope does not have to be changed, since the measurement data required for this purpose are generated more or less as a secondary product of the actual high-resolution image recording.

The detector is preferably designed to detect the fluorescence photons emitted from the respective illumination target point by time-correlated single photon counting as a function of their arrival times. The application of such a time-correlated single photon counting enables particularly precise detection of the arrival times. However, the detector can also detect the arrival times of the fluorescence photons in another manner, for example, in that it adds up the light intensity, i.e., the incident fluorescence photons in at least two individual successive time intervals, wherein these at least two intervals are in the range of the fluorescence lifetime after a starting time, to which the arrival times of the fluorescence photons are related. The fluorescence photons related to one time interval are then assigned to the one sample image and the fluorescence photons related to the other time interval are assigned to the other sample image.

The fluorescence scanning microscope preferably comprises an adjustment element, which is controllable by the processor to influence the excitation light distribution and/or the de-excitation light distribution to compensate for the spatial offset. Due to the use of such an adjustment element, it is possible to achieve a precise superposition of excitation and de-excitation light distribution automatically during the actual image recording, whereby a high imaging quality is ensured.

The adjustment element is preferably controllable by the processor to influence the excitation light distribution and/or the de-excitation light distribution to compensate for the spatial offset individually for various regions of an image field. In this way, it is possible to perform the optimization of the superposition of the light distributions adaptively if it is ensured that the adjustment element operates at sufficiently high speed.

In one preferred embodiment, the adjustment element is a light deflection element arranged adjustably in the beam path of the de-excitation light distribution or in the beam path of the excitation light distribution. Such a light deflection element can be embodied, for example, in the form of a rapidly tilting mirror. In order to also be able to adjust the axial direction during a three-dimensional correction of the superposition of the light distributions, an adjustable lens or an adjustable lens system is conceivable as an adjustment element, which ensures that one of the two light distributions is adjustable in the axial direction in relation to the other light distribution. The use of a spatial light modulator (SLM) is also conceivable, which takes over this task. The lateral deflection and at the same time the axial position of a light distribution can be influenced thereby within certain limits. Moreover, the phase information which is necessary for generating the spatially special de-excitation light distribution can also be generated using this element.

In one particularly preferred embodiment, at least one of the two light sources is a pulsed or modulated laser light source, wherein the detector is designed to detect the arrival times of the fluorescence photons in relation to a starting time which is defined by a light pulse or a light modulation of the laser light source. The use of a pulsed laser light source has certain advantages over a modulated source since the lifetimes of the fluorophores observed here are generally so short that a very rapid light modulation is necessary.

The processor preferably evaluates the fluorescence photons acquired in the respective illumination target point in that it compares the arrival times to a predetermined threshold value and assigns those fluorescence photons, the arrival times of which are less than or equal to the predetermined threshold value, to the first pixel and assigns those fluorescence photons, the arrival times of which are greater than the predetermined threshold value, to the second pixel. In this embodiment, the fluorescence photons are classified more or less into early and late photons on the basis of a single threshold value. The sample image having the lower resolution is generated here on the basis of the early fluorescence photons and the sample image spatially offset thereto having the higher resolution is generated on the basis of the late fluorescence photons. The reason for the different resolutions is that the effect of the de-excitation light distribution increases with the dose to which the fluorophores are subjected. In other words, the effect of the de-excitation light distribution on the fluorophores is all the greater the longer the sample is illuminated using the de-excitation light distribution. The early fluorescence photons therefore correspond more to a fluorescence signal which would be obtained without the use of the de-excitation light, while the late fluorescence photons represent a fluorescence signal which corresponds to the signal acquired in a conventional STED method. Accordingly, the early fluorescence photons primarily supply information about the excitation light distribution, in particular its maximum, while the late fluorescence photons above all reflect the de-excitation light distribution, in particular its zero point.

The above-explained embodiment, in which the fluorescence photons are classified on the basis of a single threshold value into early and late fluorescence photons, represents a particularly simple method for determining the spatial offset of the light distributions.

The evaluation may be expanded, however, in such a way that the fluorescence photons are not only grouped into two classes, namely into an early class and a late class according to their arrival times at the detector, but rather the actual arrival times of all fluorescence photons are individually taken into consideration. For this purpose, the processor can evaluate, for example, the fluorescence photons detected in the respective illumination target point in that it fits a model function which contains a first fit parameter and a second fit parameter to a time distribution of the fluorescence photons given by the acquired arrival times and thus ascertains the first fit parameter and the second fit parameter. The processor then generates the first pixel on the basis of the first fit parameter and the second pixel on the basis of the second fit parameter. In this way, a model function is adapted to the time distribution of the detected fluorescence photons for each pixel.

The model function is given, for example, by the following equation (1):

$$m(t) = a0 * \exp(-t/t0) + a1 * \exp(-t/t1) \quad (1)$$

wherein t denotes the arrival time of the respective fluorescence photon, t0 denotes a mean lifetime of the fluorophores upon absence of the de-excitation light distribution, t1 denotes a mean lifetime of the fluorophores upon presence of the de-excitation light distribution, a0 denotes the first fit parameter, and a1 denotes the second fit parameter.

The fit parameters a0 and a1 are determined separately for each illumination target point. More information is used due to the consideration of the actual arrival times than if the arrival times are merely grouped into two classes. The spatial offset can accordingly also be determined more precisely.

The excitation light source is preferably the pulsed or modulated laser light source which defines the starting time. This has the advantage that it is also possible to work in conventional STED methods using pulsed excitation light sources. No changes therefore have to be performed to already existing STED configurations.

The de-excitation light source can be embodied as a continuous wave laser light source or also as a pulsed or modulated laser light source. The embodiment as a continuous wave laser light source has the advantage, however, that such a source is significantly less expensive than a pulsed source, in particular if the latter has to operate at high laser powers as in typical STED applications.

Embodiments are particularly preferred which provide a combination of pulsed excitation and continuous wave de-excitation or a combination of pulsed excitation and pulsed de-excitation. However, it is also possible to provide a combination of continuous wave excitation and pulsed de-excitation.

The fluorescence scanning microscope preferably comprises a delay unit, which is controllable by the processor to match the de-excitation light source with the excitation light source with respect to time in such a way that the light pulse or the light modulation of the de-excitation light source at the position of the respective illumination target point has a predetermined delay in relation to the light pulse or the light modulation of the excitation light source. Such an embodiment is advantageously considered in particular if both the excitation light source and also the de-excitation light source are embodied as pulsed or modulated laser light sources.

If the arrival times of the fluorescence photons at the detector are classified into two classes on the basis of the above-mentioned threshold value, in the above-explained embodiment, this threshold value thus corresponds to the delay which the light pulse or the light modulation of the de-excitation light source has at the position of the respective illumination target point in relation to the light pulse or the light modulation of the excitation light source.

In particular if both the excitation light source and also the de-excitation light source are embodied as pulsed laser light sources, the pulse length of the de-excitation light source is preferably greater than the pulse length of the excitation light source. Alternatively or additionally, the pulse length of the de-excitation light source can be in the range of the mean lifetime of the excited state of the fluorophores, in particular in a range of 0.1 to 6.0 ns.

In a further embodiment, the processor can be designed to determine a further mismatch of the de-excitation light distribution in addition to the spatial offset on the basis of the two sample images. In this embodiment, the spatial offset between the maximum of the excitation light source and the zero point of the de-excitation light source is viewed as a special case of a general misalignment of the de-excitation light distribution, which takes into consideration further mismatches in addition to the above-mentioned offset. One example of this is, for example, a mismatch which is caused by a spheric aberration. The latter can be reduced, for example, in that the brightnesses of the two sample images having low or high resolution, respectively, are compared to one another and on the basis of this comparison, for example, a spatial light modulator (abbreviated SLM) in the beam path of the de-excitation light or also a positioning element in the microscope objective is activated accordingly to minimize the spheric aberration.

This is of practical relevance in particular if such a spheric aberration disadvantageously influences the de-excitation light distribution. Above all the quality of the zero point of the de-excitation light distribution thus has a significant influence on the imaging quality. This is because the STED method is dependent due to its nonlinearity on the intensity of the de-excitation light distribution actually being zero in its minimum and rising rapidly with distance from this minimum.

A spheric aberration in the de-excitation beam path thus has a significantly more disadvantageous effect than in the excitation beam path. It is nonetheless possible to use the sample image which is generated solely by the excitation beam as a reference, for example, as a reference for the image brightness. It is not necessary due to the brightness comparison of the two sample images to employ a quality measure which is complex to determine, and on the basis of which it first has to be judged how well the correction of the spheric aberration has succeeded. A reference is more or less inherent to the correction due to the consideration of two sample images, which is not the case, for example, if the quality of the correction is to be judged on the basis of a single image.

It is directly apparent from the above explanations that the intensity minimum of the de-excitation light distribution is preferably an intensity zero point.

In a further embodiment, the invention provides a method for imaging a sample using a fluorescence scanning microscope. The method comprises the following steps: generating an excitation light distribution which excites fluorophores present in the sample to the spontaneous emission of fluorescence photons; generating a de-excitation light distribution, which de-excites the fluorophores excited by the excitation light distribution in the sample in the course of a stimulated emission of fluorescence photons; combining the excitation light distribution and the de-excitation light distribution to form a light distribution scanning over multiple illumination target points of the sample in such a way that an intensity maximum of the excitation light distribution and an intensity minimum of the de-excitation light distribution are spatially superimposed on one another in the respective illumination target point; detecting the fluorescence photons emitted from the respective illumination target point as a function of their arrival times by time-correlated single photon counting; evaluating the fluorescence photons acquired in the respective illumination target point with respect to their arrival times; generating a first pixel and a second pixel, which represent the respective illumination target point, on the basis of this evaluation; assembling the first pixels to form a first sample image and the second pixels to form a second sample image; and determining a spatial offset between the intensity maximum of the excitation light distribution and the intensity minimum of the de-excitation light distribution on the basis of the two sample images.

Figure 2:
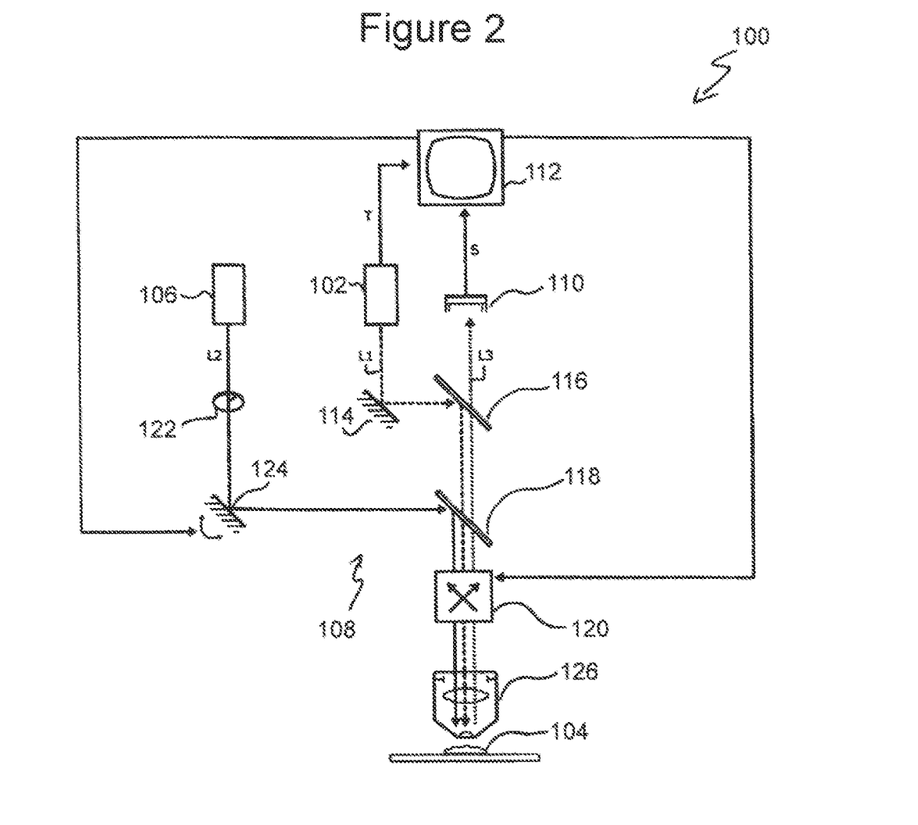
FIG. 2 shows a schematic illustration of a fluorescence scanning microscope according to one exemplary embodiment.

FIG. 2 shows a schematic illustration of a fluorescence scanning microscope 100 according to one exemplary embodiment. In the following, first the fundamental structure and the fundamental functionality of the fluorescence scanning microscope 100 are to be briefly outlined, before a specific implementation according to the exemplary embodiment shown is then explained in more detail.

The fluorescence scanning microscope 100 comprises an excitation light source 102, which is designed to generate an excitation light distribution E of the type shown in FIG. 1, which excites fluorophores present in a sample 104 to the spontaneous emission of fluorescent light. The wavelength of the excitation light distribution E generated by the excitation light source 102 is thus designed for the fluorophores used in the specific application.

The fluorescence scanning microscope 100 furthermore comprises a de-excitation light source 106, which is designed to generate a de-excitation light distribution D of the type shown in FIG. 1, which de-excites the fluorophores excited by the excitation light distribution in the sample 104 by stimulated emission of fluorescent light. The wavelength of the de-excitation light distribution D generated by the de-excitation light source 106 is also matched to the fluorophores used in the specific application. In particular, the wavelength of the de-excitation light source D is to be selected so that the fluorophores present in the sample 104 are reliably caused by stimulated emission to return from their excited state into the base state upon irradiation using the de-excitation light distribution D. For this purpose, the de-excitation light distribution D preferably has a wavelength which is approximately equal to the wavelength of the fluorescent light which the fluorophores emit upon the transition from the excited state into the base state.

The fluorescence scanning microscope 100 furthermore has an illumination unit, identified in general by 108 in FIG. 2. The latter is designed so that it combines the excitation light distribution E and the de-excitation light distribution D to form a superimposed light distribution and scans a plurality of illumination target points of the sample 104 using the light distribution thus generated. The combination takes place in such a way that an intensity maximum M of the excitation light distribution E and an intensity minimum N of the de-excitation light distribution D are spatially superimposed on one another in the respective illumination target point. A spatial superposition as shown by way of example in FIG. 1a explained at the outset is desired here. However, since a certain misalignment is generally unavoidable, a non-negligible spatial offset often occurs between the intensity maximum M of the excitation light distribution E and the intensity minimum N of the de-excitation light distribution D, as shown by way of example in FIG. 1b.

The fluorescence scanning microscope 100 furthermore has a detector 110, which detects the fluorescence photons emitted from the respective illumination target point. The detector 110 is designed to measure light intensities which vary rapidly over time. It is thus capable of detecting the fluorescence photons emitted from the respective illumination target point in the course of a time-correlated single photon counting.

Finally, the fluorescence scanning microscope 100 contains a processor 112, which enables it to determine the spatial offset between the excitation light distribution E and the de-excitation light distribution D. For this purpose, the processor 112 evaluates the fluorescence photons detected in the respective illumination target point with respect to their arrival times determined by the detector 110. On the basis of this evaluation, the processor 112 then generates a first pixel and a second pixel which both represent the same illumination target point. In the same way, the processor 112 proceeds for all illumination target points which are scanned using the light distribution composed of the excitation light distribution E and the de-excitation light distribution D. The processor 112 thus generates a plurality of first pixels, which it assembles into a first sample image, and a plurality of second pixels, which it assembles into a second sample image. In this way, two sample images are generated, on the basis of which the processor 112 then determines the spatial offset between the intensity maximum M of the excitation light distribution E and the intensity minimum N of the de-excitation light distribution D.

The structure specifically shown in FIG. 2 merely represents one exemplary embodiment for implementing the above-explained functional principle and is in particular not to restrict the fluorescence scanning microscope 100 to this special embodiment. In the embodiment according to FIG. 2, for example, the excitation light source 102 is embodied as a pulsed laser light source, while the de-excitation light source 106 is a continuous wave laser light source. The two light sources 102, 106 supply their light in each case to the illumination unit 108, with which in the exemplary embodiment according to FIG. 2 all microscope components are to be associated with the exception of the two light sources 102, 106, the detector 110, and the processor 112.

The excitation light source 102 especially emits excitation light L1, which is reflected via a fixed mirror 114 onto a first wavelength-selective beam splitter 116. The first wavelength-selective beam splitter 116 reflects the excitation light L1 onto a second wavelength-selective beam splitter 118, which transmits the excitation light L1 in the direction of a scanning device 120. In contrast, the de-excitation light source 106 emits de-excitation light L2 onto a phase mask 122, which influences the de-excitation light L2 in such a way that the de-excitation light distribution D generated in the sample 104 from the excitation light L2 has the desired zero point N. After passing through the phase mask 122, the de-excitation light L2 is reflected at an adjustment element 124 activatable by the processor 112, for example, a movable tilting mirror, onto the second wavelength-selective beam splitter 118. Alternatively, for example, a SLM can also be used as the adjustment element 124. Moreover, the phase mask 112 and the adjustment element 124 can also be formed by the same element, for example a SLM. The wavelength-selective beam splitter 118 reflects the de-excitation light L2 in the direction of the scanning device 120, which is also controlled by the processor 112.

The excitation light L1 and the de-excitation light L2 are thus superimposed on one another by the second wavelength-selective beam splitter 118 and supplied to the scanning device 120. Proceeding therefrom, the superimposed light distribution is focused by an objective 126 on the respective illumination target point, whereby the light distribution is generated in the desired form in this illumination target point, which provides the spatial superposition of the intensity maximum M of the excitation light distribution E and the intensity minimum N of the de-excitation light distribution D. The scanning device 120 ensures here that this superimposed light distribution is moved over the sample 104, so that a plurality of illumination target points of the sample 104 are scanned using this light distribution.

The sample 104 illuminated using the superimposed light distribution emits fluorescent light L3, which is returned via the objective 126 to the scanning device 120. In the exemplary embodiment according to FIG. 2, a so-called de-scanned detection of the fluorescent light L3 is thus provided. Subsequently, the fluorescent light L3 passes the two wavelength-selective beam splitters 118, 116 in succession and is incident on the detector 110, which detects the fluorescent light L3 and outputs a corresponding output signal S to the processor 112.

As already explained, the detector 110 detects the fluorescence photons representing the fluorescent light L3 in the course of the time-correlated single photon counting. The detector 110 detects the arrival times of the fluorescence photons in relation to a starting time, which is defined in the exemplary embodiment according to FIG. 2 by a light pulse, which the excitation light source 102 embodied as a pulsed laser light source emits. For this purpose, the excitation light source 102 outputs an electrical trigger signal T to the processor 112, from which the times of the individual laser pulses and thus the above-mentioned starting times can be determined.

On the basis of the arrival times of the fluorescence photons evaluated by the processor 112, the processor 112 controls the adjustment element 124 in order to influence the de-excitation light distribution D so that the spatial offset between the intensity maximum M of the excitation light distribution E and the intensity minimum N of the de-excitation light distribution D is compensated for. In the exemplary embodiment according to FIG. 2, the adjustment element 124 is located in the beam path of the de-excitation light L2. However, it is also conceivable to arrange a corresponding adjustment element in the beam path of the excitation light E. The adjustment element 124 designed as a tilting mirror in the exemplary embodiment according to FIG. 2 also offers the option, if it may be activated sufficiently rapidly by the processor 112, of individually influencing the de-excitation light distribution D for various regions of a recorded image field in an adaptive process.

As explained above, the processor 112 generates two sample images based on the evaluation of the fluorescence photons, on the basis of which the spatial offset between excitation and de-excitation light distribution may be determined. In the exemplary embodiment according to FIG. 2, for this purpose the processor 112 evaluates the fluorescence photons detected in each illumination target point in that it compares the arrival times to a predetermined threshold value. Those fluorescence photons, the arrival times of which are less than or equal to the predetermined threshold value, are assigned by the processor 112 to a first pixel corresponding to the respective illumination target point. In contrast, the processor 112 assigns those fluorescence photons, the arrival times of which are greater than the predetermined threshold value, to a second pixel corresponding to the same illumination target point. In this way, the processor 112 generates the two sample images, of which one is assigned early fluorescence photons and the other is assigned late fluorescence photons. This type of evaluation is illustrated by way of example in FIG. 3 for the one-dimensional case.

Figure 3:
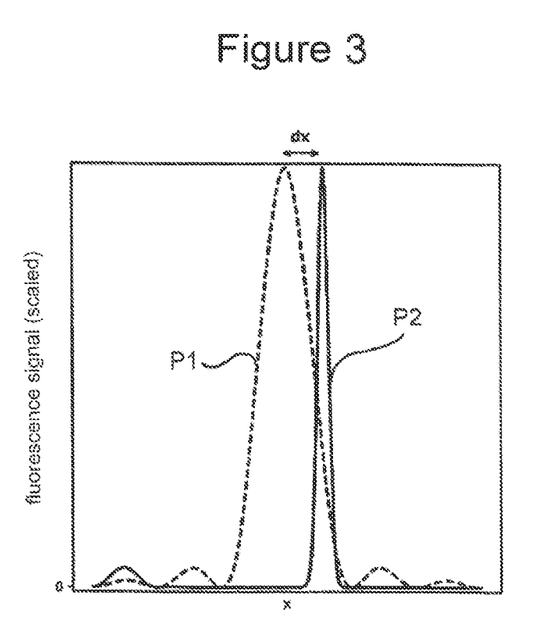
FIG. 3 shows a diagram which shows the spatial distribution of fluorescence signals which represent early fluorescence photons and late fluorescence photons according to one exemplary embodiment.

In FIG. 3, the dashed line P1 shows the curve of the fluorescence signal of a point object generated from the early fluorescence photons along the direction x. In contrast, the solid line P2 shows the associated fluorescence signal which is obtained from the late fluorescence photons. The fluorescence signal P2 has the lower full width at half maximum and is therefore suitable for generating a high-resolution sample image.

The full widths at half maximum of the fluorescence signals P1, P2 are established because the fluorescence signal P1 represented by the early fluorescence photons is still influenced little by the de-excitation light distribution D. In contrast, the de-excitation light distribution D is fully active for the late photons, so that the full width at half maximum of the fluorescence signal P2 is decreased, which increases the resolution.

In the example according to FIG. 3, the zero point N of the de-excitation light distribution D is offset by a spatial offset dx in relation to the maximum M of the excitation light distribution E. Both the absolute distance and also the direction of the spatial offset dx may be determined from the fluorescence signals P1, P2 shown in FIG. 3.

With respect to the illustration according to FIG. 3, it is to be noted that the fluorescence signals P1, P2 shown therein are scaled. The intensity drop, which is caused by the spatial offset dx and was explained at the outset with reference to FIG. 1d, is calculated out by this scaling.

The example according to FIG. 3 represents a particularly simple type of the evaluation of the fluorescence photons. An evaluation expanded in relation thereto is shown in the illustration according to FIG. 4. In this example, the processor 112 evaluates the fluorescence photons acquired in the respective illumination target point in that, for example, it fits the model function specified above according to equation (1) to the detected time distribution of the fluorescence photons and determines two fit parameters a0, a1 therefrom. On the basis of the two fit parameters a0, a1, the processor 112 then generates two pixels related to the same illumination target point and subsequently, by means of a plurality of such pixels, the two sample images, from which the spatial offset dx is determined.

Figure 4:
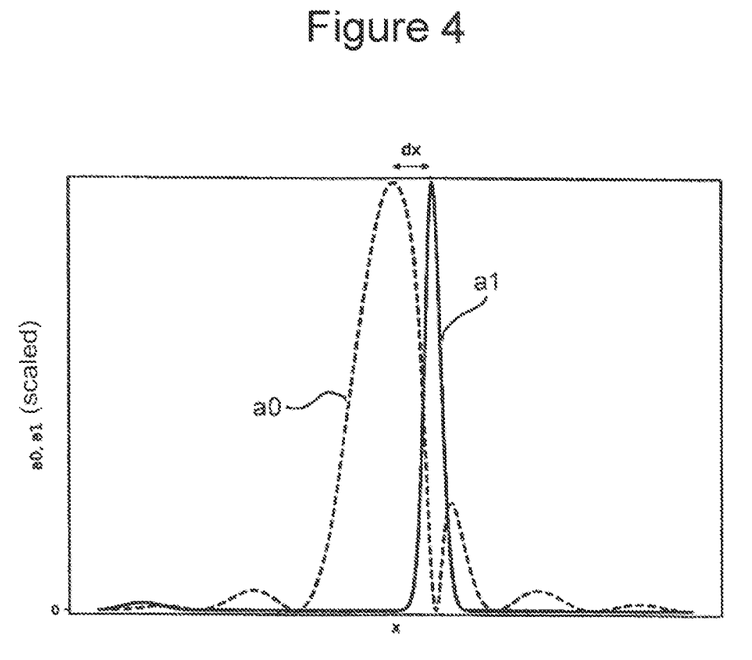
FIG. 4 shows a diagram which shows the spatial distribution of fit parameters which are used for evaluation according to a further exemplary embodiment.

FIG. 4 shows by way of example the curve of the two fit parameters a0 and a1 along the axis x when assuming a spatial offset dx between the maximum M of the excitation light distribution E and the zero point N of the de-excitation light distribution D. The solid line shows the curve of the fit parameter a1 and the dashed line shows the curve of the fit parameter a0. The curve of a1 is similar to the fluorescence signal P2 in FIG. 3, which is represented by the late photons. This is because the fit parameter a1 is a measure of the quantity of long-lived fluorophores and only these fluorophores can generate late fluorescence photons. In contrast, the curve of the fit parameter a0 is similar to the fluorescence signal P1 in FIG. 3 which is represented by the early photons. However, the fit parameter a0 has, in contrast thereto, a minimum at the point of the zero point N of the de-excitation light distribution D. This is because the fit parameter a0 is a measure of the short-lived fluorophores and no short-lived fluorophores exist at the position of the zero point N of the de-excitation light distribution D.

Figure 5:
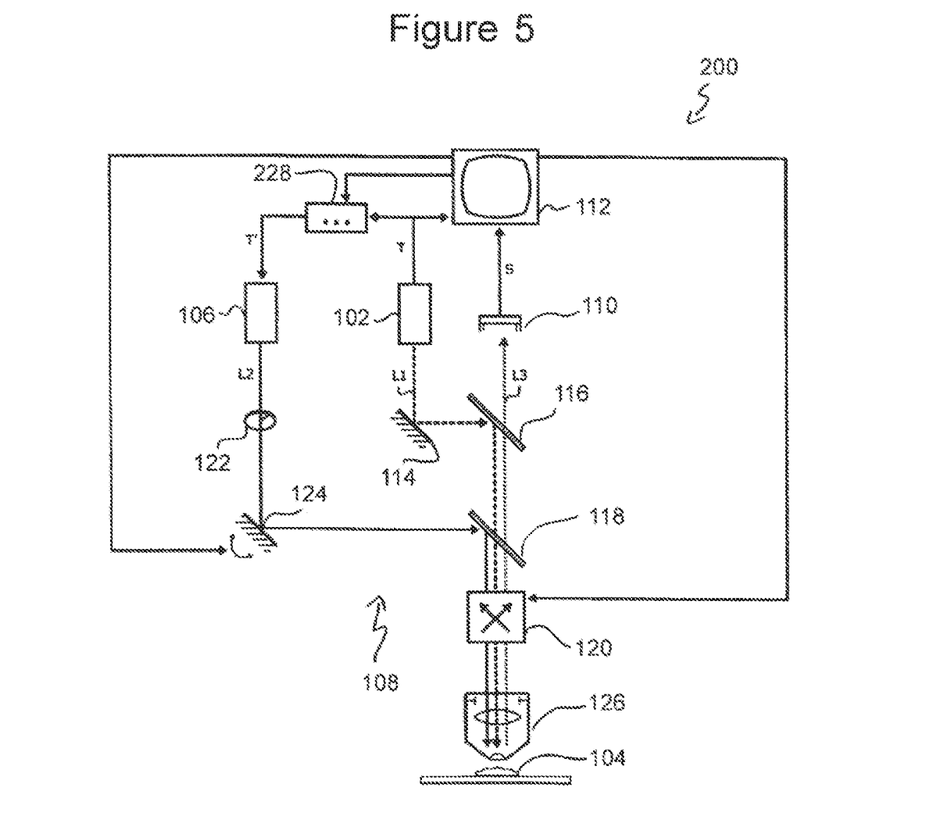
FIG. 5 shows a fluorescence scanning microscope according to a further exemplary embodiment.

FIG. 5 shows a fluorescence scanning microscope 200 which represents an embodiment modified in relation to FIG. 2. In this modified embodiment, not only the excitation light source 102, but also the de-excitation light source 106 is embodied as a pulsed laser light source.

The exemplary embodiment according to FIG. 5 additionally has a delay unit 228, which is controllable by the processor 112. The processor 112 activates the delay unit 228 so that the de-excitation light source 106 is matched with respect to time to the excitation light source 102. In particular, the delay unit 228 ensures that the respective light pulse of the de-excitation light source 106 has a predetermined delay at the location of the observed illumination target point in relation to the light pulse of the excitation light source 102.

To achieve the desired matching with respect to time, the excitation light source 102 outputs the trigger signal T to both the processor 112 and also the delay unit 228. The delay unit 228 generates a trigger signal T' delayed in relation to the trigger signal T. The delay can be adjusted by the processor 112. The delayed trigger signal T' is used to synchronize the light pulses of the de-excitation light source 106 with those of the excitation light source 102.

The evaluation of the fluorescence photons detected in the exemplary embodiment according to FIG. 5 can be performed in accordance with the method illustrated in FIGS. 3 and 4. In the case of the simpler evaluation, in which the fluorescence photons are solely classified into early and late photons, the delay T' can be adjusted so that it corresponds to the threshold value applied for this classification.

With respect to the time matching of the light sources 102, 106 in the exemplary embodiment according to FIG. 5, the light pulses of the de-excitation light source 106 are to be prevented from being very much shorter than the lifetime of the fluorophores. Moreover, it is possible in principle, but rather disadvantageous if the two light pulses coincide precisely with respect to time. This is because in this case the stimulated emission of fluorescence photons fundamentally takes place simultaneously with the excitation. However, all fluorophores which are still excited have the same lifetime after the stimulated emission, so that the fluorophores can only be differentiated with difficulty on the basis of the arrival time of their fluorescence photons at the detector 110. This case is shown in FIG. 6a.

To avoid this case, the delay unit 228 in FIG. 5 can be configured, for example, so that the light pulse emitted by the de-excitation light source 106 reaches the sample 104 by a time interval dt later than the light pulse which the excitation light source 102 emits. This solution is illustrated in FIG. 6b. Within the time span dt after the excitation light pulse, the fluorescence photons are emitted according to the excitation light distribution E. Subsequently, the stimulated emission takes place by emission of the de-excitation light pulse. A part of the fluorescence is extinguished in this case, so that preferably fluorophores in the region of the zero point N of the de-excitation light distribution D emit photons. In this way, a sample image which is generated from the early fluorescence photons gives information about the position of the maximum M of the excitation light distribution E, while a sample image which is generated from the late fluorescence photons gives information about the position of the zero point N of the de-excitation light distribution D.

Figure 6:
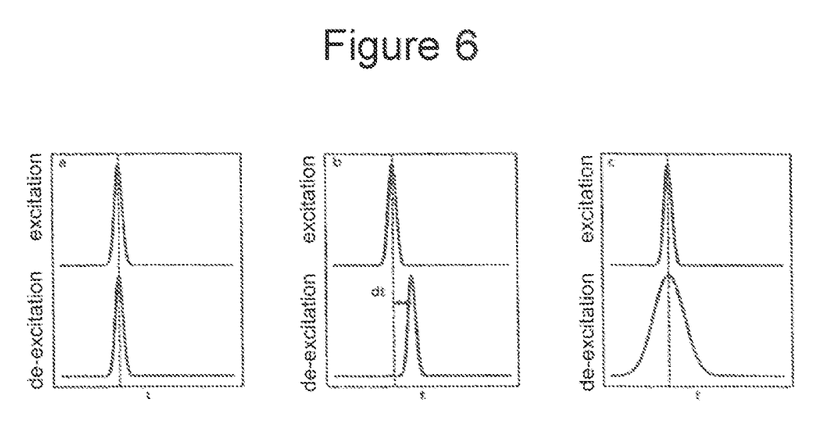
FIG. 6 shows diagrams (a, b, c) having examples to explain how pulsed excitation light and pulsed de-excitation light are to be matched to one another with respect to time.

A further possibility for the time matching is shown in FIG. 6c. Thus, for example, the pulse length of the de-excitation light pulse can be adjusted so that it is in the range of the mean lifetime of the excited state of the fluorophores, for example, in a range from 0.1 to 6.0 ns. In this case, the stimulated emission is distributed over the time range of the pulse length of the de-excitation light pulse or over the part of the de-excitation light pulse which reaches the sample 104 after the excitation light pulse with respect to time. Due to this chronological stretching of the stimulated emission, a sample image can be obtained from the early photons which is constructed according to the excitation light distribution E, while a sample image can be generated from the late fluorescence photons which is primarily constructed from the region of the zero point N of the de-excitation light distribution D.

The above-explained embodiments are to be understood solely as examples. In particular, they are also not restricted to the specifically described combinations of a pulsed laser light source and a continuous wave laser light source. For example, the fluorescence scanning microscope 100, 200 can also operate in an operating mode in which the excitation takes place by means of a continuous wave laser light source and the de-excitation takes place by means of a pulsed laser light source. In such an embodiment, the arrival time of the fluorescence photons at the detector 110 is related to the pulse times of the de-excitation light D. The fluorescence photons which are detected shortly after the de-excitation pulse then contain information about the position of the zero point N of the de-excitation light distribution D. In contrast, the fluorescence photons which are detected shortly before or a long time after the de-excitation pulse contain information about the position of the maximum M of the excitation light distribution E.

Although some aspects have been described in the context of a device, it is clear that these aspects also represent a description of the corresponding method, wherein a block or a device corresponds to a method step or a function of a method step. Similarly thereto, aspects which are described in the context of a method step also represent a description of a corresponding block or element or a property of a corresponding device. Some or all method steps can be executed by (or using) a hardware device, which can be, for example, a processor, a microprocessor, a programmable computer, or an electronic circuit. In some exemplary embodiments, one or more of the most important method steps can be executed by such a device.

Depending on specific implementation requirements, exemplary embodiments of the invention can be implemented in hardware or software. The implementation can be carried out using a nonvolatile storage medium such as a digital storage medium, for example, a diskette, a DVD, a Blu-ray, a CD, a ROM, a PROM and EPROM, an EEPROM, or a FLASH memory, on which electronically readable control signals are stored, which interact (or can interact) with a programmable computer system so that the respective method is carried out. The digital storage medium can therefore be computer readable.

Some exemplary embodiments according to the invention comprise a data carrier having electronically-readable control signals which can interact with a programmable computer system so that one of the methods described herein is carried out.

In general, exemplary embodiments of the present invention can be implemented as a computer program product having a program code, wherein the program code acts to execute one of the methods when the computer program product runs on a computer. The program code can be stored, for example, on a machine-readable carrier.

Further exemplary embodiments comprise the computer program for carrying out one of the methods described herein, which is stored on a machine-readable carrier.

In other words, one exemplary embodiment of the present invention is therefore a computer program having a program code for carrying out one of the methods described herein when the computer program runs on a computer.

A further exemplary embodiment of the present invention is therefore a storage medium (or a data carrier or a computer-readable medium), which comprises a computer program stored thereon for executing one of the methods described herein when it is executed by a processor. The data carrier, the digital storage medium, or the recorded medium are generally tangible and/or not seamless. A further exemplary embodiment of the present invention is a device as described herein which comprises a processor and the storage medium.

A further exemplary embodiment of the invention is therefore a data stream or a signal sequence which represents the computer program for carrying out one of the methods described herein. The data stream or the signal sequence can be configured, for example, so that it is transmitted via a data communication connection, for example, via the Internet.

A further exemplary embodiment comprises a processing means, for example, a computer or a programmable logic device, which is configured or adapted to execute one of the methods described herein.

A further exemplary embodiment comprises a computer on which the computer program for executing one of the methods described herein is installed.

A further exemplary embodiment according to the invention comprises a device or a system which is configured to transmit (for example electronically or optically) a computer program for executing one of the methods described herein to a receiver. The receiver can be, for example, a computer, a mobile device, a storage device, or the like. The device or the system can comprise, for example, a file server for transmitting the computer program to the receiver.

In some exemplary embodiments, a programmable logic device (for example, a field-programmable gate array (FPGA)) can be used to execute some or all functionalities of the methods described herein. In some exemplary embodiments, a field-programmable gate array can cooperate with a microprocessor to carry out one of the methods described herein. In general, the methods are preferably carried out by any hardware device.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 fluorescence scanning microscope
102 excitation light source
104 sample
106 de-excitation light source
108 illumination unit
110 detector
112 processor
114 mirror
116 wavelength-selective beam splitter
118 wavelength-selective beam splitter
120 scanning device
122 phase mask
124 adjustment element
126 objective
228 delay unit
D de-excitation light distribution
E excitation light distribution
N intensity minimum of the de-excitation light distribution
M intensity maximum of the excitation light distribution
P1 fluorescence signal
P2 fluorescence signal
a0 fit parameter
a1 fit parameter
dx offset
dt time interval
T trigger signal
$T^1$ trigger signal
L1 excitation light
L2 de-excitation light
L3 fluorescence light

The invention claimed is:

1. A fluorescence scanning microscope, comprising:
an excitation light source, which is configured to generate an excitation light distribution, which excites fluorophores present in a sample to a spontaneous emission of fluorescence photons,
a de-excitation light source, which is configured to generate a de-excitation light distribution, which de-excites the fluorophores excited by the excitation light distribution in the sample in a course of a stimulated emission of fluorescence photons, wherein the excitation light source and the de-excitation light source are pulsed or modulated laser light sources,
delay circuitry, which is configured to match the de-excitation light source with the excitation light source with respect to time in such a way that the light pulse or the light modulation of the de-excitation light source has a predetermined delay at a position of the respective illumination target point in relation to the light pulse or the light modulation of the excitation light source,
an illumination apparatus, which is configured to combine the excitation light distribution and the de-excitation light distribution to form a light distribution scanning over multiple illumination target points of the sample in such a way that an intensity maximum of the excitation light distribution and an intensity minimum of the de-excitation light distribution are spatially superimposed on one another in the respective illumination target point,
a detector, which is configured to detect the fluorescence photons emitted from the respective illumination target point as a function of arrival times of the fluorescence photons, and
a processor, which is configured to:
evaluate the fluorescence photons detected in the respective illumination target point with respect to the arrival times, generate first pixel characteristics and second pixel characteristics based on the evaluation, which represent the respective illumination target point,
assemble the first pixel characteristics to form a first sample image and the second pixel characteristics to form a second sample image, and
based on the two sample images, determine a spatial offset between the intensity maximum of the excitation light distribution and the intensity minimum of the de-excitation light distribution.

2. The fluorescence scanning microscope as claimed in claim 1, wherein the detector is configured to detect the fluorescence photons emitted from the respective illumination target point by time-correlated single photon counting as a function of the arrival times.

3. The fluorescence scanning microscope as claimed in claim 1, further comprising an adjustment element, which is controllable by the processor to influence the excitation light distribution and/or the de-excitation light distribution to compensate for the spatial offset.

4. The fluorescence scanning microscope as claimed in claim 3, wherein the adjustment element is controllable by the processor to influence the excitation light distribution and/or the de-excitation light distribution to compensate for the spatial offset for various regions of an image field individually.

5. The fluorescence scanning microscope as claimed in claim 3, wherein the adjustment element is a light deflection element adjustably arranged in the beam path of the de-excitation light distribution or in the beam path of the excitation light distribution.

6. The fluorescence scanning microscope as claimed in claim 1, wherein the detector is configured to detect the arrival times of the fluorescence photons in relation to a starting time, which is defined by the light pulse or the light modulation of the excitation light source.

7. The fluorescence scanning microscope as claimed in claim 6, wherein the processor is configured to evaluate the fluorescence photons detected in the respective illumination target point by comparing the arrival times to a predetermined threshold value and assigning the fluorescence photons that have arrival times which are less than or equal to the predetermined threshold value to the first pixel characteristics and assigning the fluorescence photons that have arrival times which are greater than the predetermined threshold value to the second pixel characteristics.

8. The fluorescence scanning microscope as claimed in claim 7, wherein the threshold value corresponds to a delay which the light pulse or the light modulation of the de-excitation light source has at the position of the respective illumination target point in relation to the light pulse or the light modulation of the excitation light source.

9. The fluorescence scanning microscope as claimed in claim 6, wherein the processor is configured to evaluate the fluorescence photons acquired in the respective illumination target point by fitting a model function which includes a first fit parameter and a second fit parameter to a time distribution of the fluorescence photons given by the detected arrival times so as to ascertain the first fit parameter and the second fit parameter, and wherein the processor is configured to generate the first pixel characteristics based on the first fit parameter and the second pixel characteristics based on the second fit parameter.

10. The fluorescence scanning microscope as claimed in claim 8, wherein the model function is given by the following function m(t):

$$m(t) = a0 * \exp(-t/t0) + a1 * \exp(-t/t1) \quad (1)$$

where:
t is the arrival time of the respective fluorescence photon,
t0 is a mean lifetime of the fluorophores upon absence of the de-excitation light distribution,
t1 is a mean lifetime of the fluorophores upon presence of the de-excitation light distribution,
a0 is the first fit parameter, and
a1 is the second fit parameter.

11. The fluorescence scanning microscope as claimed in claim 6, wherein the excitation light source is the pulsed or modulated laser light source which defines the starting time.

12. The fluorescence scanning microscope as claimed in claim 1, wherein a pulse length of the de-excitation light source is greater than a pulse length of the excitation light source, and/or wherein the pulse length of the de-excitation light source is in a range of a mean lifetime of an excited state of the fluorophores from 0.1 to 6.0 ns.

13. The fluorescence scanning microscope as claimed in claim 1, wherein the processor is configured to determine a further mismatch of the de-excitation light distribution based on the two sample images in addition to the spatial offset.

14. The fluorescence scanning microscope as claimed in claim 1, wherein the intensity minimum of the de-excitation light distribution is an intensity zero point.

15. The fluorescence scanning microscope as claimed in claim 1, wherein the processor is configured to determine the spatial offset by bringing the two sample images into a relationship with one another via a cross-correlation.

16. A method for imaging a sample using a fluorescence scanning microscope, the method comprising:
generating, using an excitation light source, an excitation light distribution, which excites fluorophores present in the sample to a spontaneous emission of fluorescence photons,
matching, using delay circuitry, a de-excitation light source with the excitation light source with respect to time in such a way that a light pulse or a light modulation of the de-excitation light source has a predetermined delay at one or more positions in relation to a light pulse or a light modulation of the excitation light source,
generating, using the de-excitation light source, a de-excitation light distribution, which de-excites the fluorophores excited by the excitation light distribution in the sample in a course of a stimulated emission of fluorescence photons,
combining the excitation light distribution and the de-excitation light distribution to form a light distribution scanning over multiple illumination target points of the sample in such a way that an intensity maximum of the excitation light distribution and an intensity minimum of the de-excitation light distribution are spatially superimposed on one another in the respective illumination target point,
detecting the fluorescence photons emitted from the respective illumination target point as a function of arrival times of the fluorescence photons,
evaluating the fluorescence photons detected in the respective illumination target point with respect to the arrival times,
generating first pixel characteristics and second pixel characteristics, which represent the respective illumination target point, based on the evaluation,
assembling the first pixel characteristics to form a first sample image and the second pixel characteristics to form a second sample image, and
determining a spatial offset between the intensity maximum of the excitation light distribution and the intensity minimum of the de-excitation light distribution based on the two sample images.

17. The method as claimed in claim 16, wherein the spatial offset is determined by bringing the two sample images into a relationship with one another via a cross-correlation.

18. A fluorescence scanning microscope, comprising:
an excitation light source, which is configured to generate an excitation light distribution, which excites fluorophores present in a sample to a spontaneous emission of fluorescence photons,
a de-excitation light source, which is configured to generate a de-excitation light distribution, which de-excites the fluorophores excited by the excitation light distribution in the sample in a course of a stimulated emission of fluorescence photons, wherein a pulse length of the de-excitation light source is greater than a pulse length of the excitation light source, and/or wherein the pulse length of the de-excitation light source is in a range of a mean lifetime of an excited state of the fluorophores from 0.1 to 6.0 ns,
an illumination apparatus, which is configured to combine the excitation light distribution and the de-excitation light distribution to form a light distribution scanning over multiple illumination target points of the sample in such a way that an intensity maximum of the excitation light distribution and an intensity minimum of the de-excitation light distribution are spatially superimposed on one another in the respective illumination target point, a detector, which is configured to detect the fluorescence photons emitted from the respective illumination target point as a function of arrival times of the fluorescence photons, and a processor, which is configured to:
  evaluate the fluorescence photons detected in the respective illumination target point with respect to the arrival times, generate first pixel characteristics and second pixel characteristics based on the evaluation, which represent the respective illumination target point,
  assemble the first pixel characteristics to form a first sample image and the second pixel characteristics to form a second sample image, and based on the two sample images, determine a spatial offset between the intensity maximum of the excitation light distribution and the intensity minimum of the de-excitation light distribution.

\* \* \* \* \*